(12) United States Patent
Liao et al.

(10) Patent No.: US 7,801,038 B2
(45) Date of Patent: Sep. 21, 2010

(54) METHOD AND APPARATUS FOR PROVIDING A DELAY GUARANTEE FOR A WIRELESS NETWORK

(75) Inventors: Raymond Rui-Feng Liao, Pleasant Hill, CA (US); James Cheng, San Ramon, CA (US)

(73) Assignee: Siemens Corporation, Iselin, NJ (US)

( * ) Notice: Subject to any disclaimer, the term of this patent is extended or adjusted under 35 U.S.C. 154(b) by 1144 days.

(21) Appl. No.: 10/692,269

(22) Filed: Oct. 23, 2003

(65) Prior Publication Data

US 2005/0013316 A1     Jan. 20, 2005

Related U.S. Application Data

(60) Provisional application No. 60/487,573, filed on Jul. 14, 2003.

(51) Int. Cl.
*H04W 16/04* (2009.01)
*H04W 16/22* (2009.01)

(52) U.S. Cl. ............. 370/230.1; 370/235; 370/395.43; 455/452.2; 709/225

(58) Field of Classification Search ......... 370/229–235, 370/449–457, 395.21, 395.4–395.43, 431–435; 709/225–229; 455/450–453
See application file for complete search history.

(56) References Cited

U.S. PATENT DOCUMENTS

| | | | |
|---|---|---|---|
| 5,432,790 A | 7/1995 | Hluchyj et al. | |
| 5,633,861 A | 5/1997 | Hanson et al. | |
| 5,757,772 A | 5/1998 | Thornberg et al. | |
| 5,995,488 A * | 11/1999 | Kalkunte et al. | 370/232 |
| 6,002,667 A | 12/1999 | Manning et al. | |
| 6,377,548 B1 * | 4/2002 | Chuah | 370/233 |
| 6,529,499 B1 | 3/2003 | Doshi et al. | |
| 6,574,220 B1 | 6/2003 | Petty | |
| 6,747,968 B1 * | 6/2004 | Seppala et al. | 370/338 |
| 6,862,270 B1 * | 3/2005 | Ho | 370/328 |
| 7,039,032 B1 * | 5/2006 | Ho et al. | 370/338 |
| 7,068,632 B1 * | 6/2006 | Ho et al. | 370/338 |
| 7,154,877 B2 * | 12/2006 | Le et al. | 370/346 |
| 7,414,986 B2 * | 8/2008 | Kandala et al. | 370/310 |
| 2002/0080816 A1 * | 6/2002 | Spinar et al. | 370/449 |
| 2002/0159418 A1 * | 10/2002 | Rudnick et al. | 370/338 |
| 2003/0063563 A1 * | 4/2003 | Kowalski | 370/230 |
| 2003/0067903 A1 * | 4/2003 | Jorgensen | 370/338 |
| 2003/0214928 A1 * | 11/2003 | Chuah | 370/336 |
| 2004/0047351 A1 * | 3/2004 | Del Prado Pavon et al. | 370/395.4 |

(Continued)

FOREIGN PATENT DOCUMENTS

WO    WO 03/017570    2/2003

OTHER PUBLICATIONS

Antonio Grilo, Mario Macedo, and Mario Nunes, "A Scheduling Algorithm for QoS Support in IEEE802.11 E Networks", IEEE, Jun. 2003, pp. 36-43.*

(Continued)

*Primary Examiner*—Aung S Moe
*Assistant Examiner*—Habte Mered
(74) *Attorney, Agent, or Firm*—Donald B. Paschburg

(57) ABSTRACT

A system, method, apparatus, means, and computer program code for providing a delay guarantee for a wireless network is provided.

20 Claims, 7 Drawing Sheets

U.S. PATENT DOCUMENTS

| | | | |
|---|---|---|---|
| 2004/0170186 A1* | 9/2004 | Shao et al. | 370/412 |
| 2004/0196850 A1* | 10/2004 | Ho | 370/395.4 |
| 2004/0208183 A1* | 10/2004 | Balachandran et al. | 370/395.21 |
| 2005/0003794 A1* | 1/2005 | Liu | 455/355 |
| 2005/0041670 A1* | 2/2005 | Lin et al. | 370/395.21 |
| 2007/0002890 A1* | 1/2007 | Mangold et al. | 370/459 |
| 2007/0038752 A1* | 2/2007 | Jorgensen | 709/226 |
| 2007/0038753 A1* | 2/2007 | Jorgensen | 709/226 |
| 2007/0109980 A1* | 5/2007 | Awater et al. | 370/310 |
| 2007/0208847 A1* | 9/2007 | Knauerhase et al. | 709/223 |

OTHER PUBLICATIONS

Daqing Gu and Jinyun Zhang, "QoS Enhancement in IEEE802.11 Wireless Local Area Networks", IEEE, Jun. 2003, pp. 120-124.*

Wasan Pattara-Atikom and Prashant Krishnamurthy, "Distributed Mechanisms for Quality of Service in Wireless LANs", IEEE, Jun. 2003, pp. 26-34.*

Wasan Pattara-Atikom and Prashant Krishnamurthy, "Distributed Mechanisms for Quality of Service in Wireless LAN's", IEEE Wireless Communications, Jun. 30, 2003, pp. 26-34.

Daqing Gu and Jingyun Zhang, "QoS Enhancement in IEEE802.11 Wireless Local Area Networks", IEEE Communications Magazine, Jun. 30, 2003, pp. 120-124.

Impact of Polling Strategy on Capacity of 802.11 Based Wireless Multimedia LANs, Ravindra S. Ranasighe, Lachlan L.H. Andrew, David Everitt, Department of Electrical and Electronic Engineering, The University of Melbourne, Parkville, VIC. 3052, Australia {rran, iha, d.everitt} @ee.u.oz.au, pp. 96-103, 1999.

Veres, Andras et al. "Supporting Service Differentiation in Wireless Packet Networks Using Distributed Control", IEEE Journal on Selected Areas in Communications, vol. 19, No. 10, Oct. 2001, 0733-8716. pp. 2081-2093.

Bianchi, Giuseppe "Performance Analysis of the IEEE 802.11 Distributed Coordination Function", IEEE Journal on Selected Areas in Communications, V01. 18, No. 3, Mar. 2003, 0733-8716. pp. 535-547.

Supplement to IEEE Standard for Information technology—Telecommunications and information exchange between systems—Local and metropolitan area networks—Specific requirements—"Part 11: Wireless LAN Medium Access Control (MAC) and Physical Layer (PHY) specifications—High-speed Physical Layer in the 5 GHz Band", IEEE Standard 802.11a-1999 (Supplement to IEEE Std 802.11-1999). Adopted by the ISO/IEC and redesignated as ISO/IEC 8802-11:1999/Amd 1:2000(E). Copyright © 1999 IEEE. 91pgs.

Information technology—Telecommunications and information exchange between systems—Local and metropolitan area networks—Specific requirements—"Part 11: Wireless LAN Medium Access Control (MAC) and Physical Layer (PHY) Specifications", ANSI/IEEE Std. 802.11, 1999 Edition, copyright © 1999 IEEE. 528pgs.

* cited by examiner

METHOD AND APPARATUS FOR PROVIDING A DELAY GUARANTEE FOR A WIRELESS NETWORK

CROSS-REFERENCE TO RELATED APPLICATION

This application claims priority to U.S. provisional patent application Ser. No. 60/487,573 entitled DELAY GUARANTEE FOR IEEE 802.11 BASED WIRELESS LAN NETWORKS, and filed Jul. 14, 2003, the entire contents of which are incorporated herein for all purposes.

BACKGROUND OF THE INVENTION

The present invention relates to a method and apparatus in access points for providing delay guarantee to devices in a wireless network.

BACKGROUND

A traditional distributed communication system may involve several locations, each of which includes one or more individual networked switches or access points. The access points may be in communication with each other via a local area network (LAN) or other communications network. Each access point may support one or more mobile client devices (e.g., telephones, computers), one or more of which may be communicating wirelessly.

In some situations, wireless networks may be susceptible to channel degradations caused by radio interference from Bluetooth compliant devices, microwave equipment, cordless telephones, other unknown wireless networks or devices, etc., as well as by physical obstructions. The resulting delays in ability to use the wireless network (e.g., transmit a signal via the wireless network) and data losses can lead to unreliable performance for mission critical applications. In addition, the performance of real time applications (e.g., a voice application) over a wireless network can be susceptible to long delays and large delay variations that may occur in the wireless network.

In some environments, it is difficult to guarantee a maximum delay for a mobile client device. For example, communication channel conditions may vary frequently in a wireless LAN (WLAN). Mobile client devices may consume more radio bandwidth under bad channel conditions due to rate adaptation algorithms that dynamically adjust modulation rate for transmissions based on channel conditions. The IEEE 802.11a standard for WLANs allows for eight different modulation rates while the IEEE 802.11b standard for WLANS allows for four different modulation rates. In addition, WLAN medium access control (MAC) layer transmissions can lead to bandwidth hogging by a single mobile client device under degraded channel conditions and cause other mobile client devices to wait for a long time to access the channel.

Another reason it is difficult to guarantee a maximum delay for a mobile client device is due to incomplete information and limited control at the mobile client device. For example, for an IEEE 802.11 based WLAN, distributed control like the Enhanced Distributed Coordination Function (EDCF) is preferred over centralized control like Point Coordination Function (PCF) (i.e., polling) because the delay in setting up a polling state in PCF can defeat the purpose of access time guarantee for a mobile client device when it roams across different cells in the wireless network. In contrast, distributed control can work well with the random access nature provided in an Ethernet network, which eliminates the need for setting up a connection in advance. However, the control algorithms at the WLAN access point must then be proactive and adaptive to any unexpected traffic demand from a mobile client device in order to provide access time guarantee for the mobile client device.

Another reason it is difficult to guarantee a maximum delay for a mobile client device is due to power saving and roaming feature implementations that can affect channel access time. For example, a mobile client device in power saving mode may not be able to receive information from a network in a timely fashion. In addition, a mobile client device coming out of power saving mode can invoke a large burst of downlink transmission of all of the frames that have been buffered at the access point for the mobile client device. This can negatively impact the channel access performance of other mobile client devices.

It would be advantageous to provide a method and apparatus that overcame the drawbacks of the prior art. In particular, it would be desirable to provide a method, apparatus, means, and computer code that provide a delay guarantee for a wireless network, such as an IEEE 802.11 based or compliant wireless network.

SUMMARY OF THE INVENTION

Embodiments provide a system, method, apparatus, means, and computer program code for providing a delay guarantee for a wireless network, such as an IEEE 802.11 based or compliant wireless LAN (local area network) without relying on installing client software or changing the IEEE 802.11 standard. In accordance with some embodiments, an access point classifies one or more client devices into one or more categories. Based on this classification, the access point determines the desired traffic load and allocates bandwidth to the mobile clients based on the classification and the desired traffic load. The access point also establishes a shaper interval for the client device based on its type.

The access point can regulate the downlink traffic each of its associated client devices with consideration of the uplink traffic from each of the associated client devices. The access point regulates the total uplink/downlink traffic to each associated client device so that the interframe interval for each client device is larger than a shaper interval specified by the access point. Different client devices associated with the access point may have different shaper intervals determined for them by the access point and, as a result, different interframe intervals.

Additional advantages and novel features of the invention shall be set forth in part in the description that follows, and in part will become apparent to those skilled in the art upon examination of the following or may be learned by the practice of the invention.

According to some embodiments, a method for providing a delay guarantee for each of a plurality of client devices associated with an access point may include classifying each of the plurality of client devices into one of a plurality of potential client device types; determining a desired traffic load for the plurality of client devices; and allocating shaper intervals to each of the plurality of client devices based on client device type classification and the desired traffic load. An access point may implement or conduct each of the elements of this method. In some other embodiments, a method of determining whether a request for new bandwidth should be accepted by an access point may include steps of receiving a request for new bandwidth to be provided by an access point; determining bandwidth consumption of accepted critical client devices and other client devices associated with the access point; determining critical access delay for all of the critical client devices; determining the total target frame rate for the access point based on the critical access delay; and accepting the bandwidth requirement if the request does not cause an overload condition for the access point. An access point may implement or conduct each of the elements in this method. In some embodiments, systems, means, and/or computer code may implement the one or more of the methods described herein.

With these and other advantages and features of the invention that will become hereinafter apparent, the nature of the invention may be more clearly understood by reference to the following detailed description of the invention, the appended claims and to the several drawings attached herein.

DETAILED DESCRIPTION

There is a market opportunity for systems, apparatus, computer code, and methods that provide a delay guarantee for a wireless network, such as an IEEE 802.11 based or compliant wireless LAN (local area network). As will be discussed in more detail below, in accordance with some embodiments, an access point classifies one or more client devices into one or more categories. Based on this classification, the access point determines the desired traffic load and allocates bandwidth to the client devices based on their classification and the desired traffic load. The access point also establishes a shaper interval for the client device based on its type.

The access point can regulate the downlink traffic each of its associated client devices with consideration of the uplink traffic from each of the associated client devices. The access point regulates the total uplink/downlink traffic to each associated client device so that the interframe interval for each client device is larger than a shaper interval specified by the access point. Different client devices associated with the access point may have different shaper intervals determined for them by the access point and, as a result, different interframe intervals. In addition, in some embodiments, different critical client devices may have different access delay times guaranteed to them or designated, set or established for them as part of network or device configuration. However, in the scenario where different critical client devices have different access delay times, the shortest access delay time is used for all of the critical client devices for purposes of the calculations described herein.

When the access point admits a new associated critical client device or changes the bandwidth requirement for an existing associated critical client device, the client device will have a declared bandwidth associated with it. This declared bandwidth of critical client is used to calculate the shaper intervals for the non-critical clients, as well as in admission control to decide whether to accept or reject the bandwidth requirement from the critical client. An access point may pace downlink data frame transmission to every client device so that each critical client device has enough access opportunities. The access point can adjust the interframe interval for each of the client devices based on considerations of per client device channel variations, uplink traffic, and performance impacting features of IEEE 802.11 compliant client devices (e.g., power saving features) without having to use special software on the client devices or modify the IEEE 802.11 standard.

Figure 1:
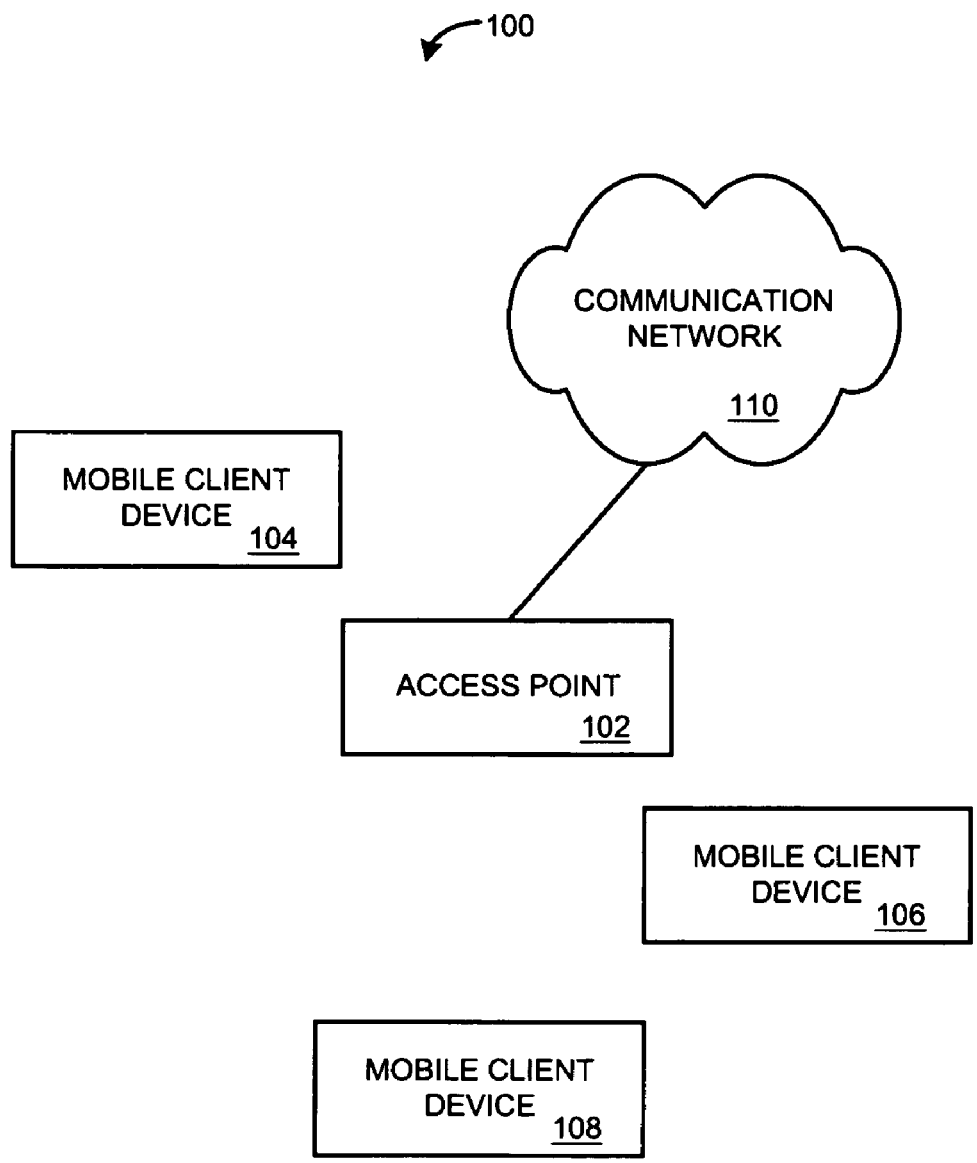
FIG. 1 is an illustration of some embodiments of a system according to some embodiments.

Now referring to FIG. 1, a network 100 may include an access point 102 that facilitates communication with and between one or more mobile or other client devices 104, 106, 108. The network also may include other access points that serve other mobile clients devices. In this regard, the area served by a single access point may be referred to as a microcell, and a mobile client device is associated with a single microcell and its associated access point. Thus, the client devices 104, 106, 108 are associated with the access point 102. In some embodiments, the access point 102 may include one or more computers, computer systems, servers, and/or other devices.

In some embodiments, individual microcells overlap to provide continuous communication with the wireless network. The actual coverage area of a microcell is dictated by many factors, including its power and environmental conditions. Access points "forward" the mobile client devices from one to another as the mobile client devices move among the associated microcells. In addition, one or more of the access points may include one or more localized trunks connected to a telephone or other communication network such as the communication network 110.

In some embodiments, the system 100 may include other network devices, such as a switch, a router, a bridge or any other network component or components which provides wireless access points with access to other networks. In this regard, the access point 102 may include one or more transceivers that connect to a wired network and receive, buffer and transmit data between a wireless LAN and the other networks. The wireless LAN may be governed by one or more of the 802.11(a), 802.11(c), 802.11 HR, ETSI BRAN HiperLAN/2, HiperLAN and other wireless LAN standards. A single access point may support several users and may have a range of up to several hundred feet. To maximize their range, access points may be mounted at an elevation higher than the mobile client devices they are expected to serve.

In some embodiments, one or more of the mobile client devices 104, 106, 108 may include or be laptop computers, PDAs (personal digital assistants), cellular telephones, other wireless device, etc. Each mobile client device 104, 106, 108 may be adapted to interface with the access point 102. Thus, one or more of the mobile client devices 104, 106, 108 may include wireless LAN adapters that are implemented as PCMCIA cards or ISA/PCI adapters.

In some embodiments, one or more of mobile client devices may include a GPS receiver for generating position information representing the respective geographic positions thereof. The receiver may be integrated with and/or peripheral to (e.g., an adapter card, a peripheral attachment or plug-in module) the one or more mobile communication devices.

Figure 2:
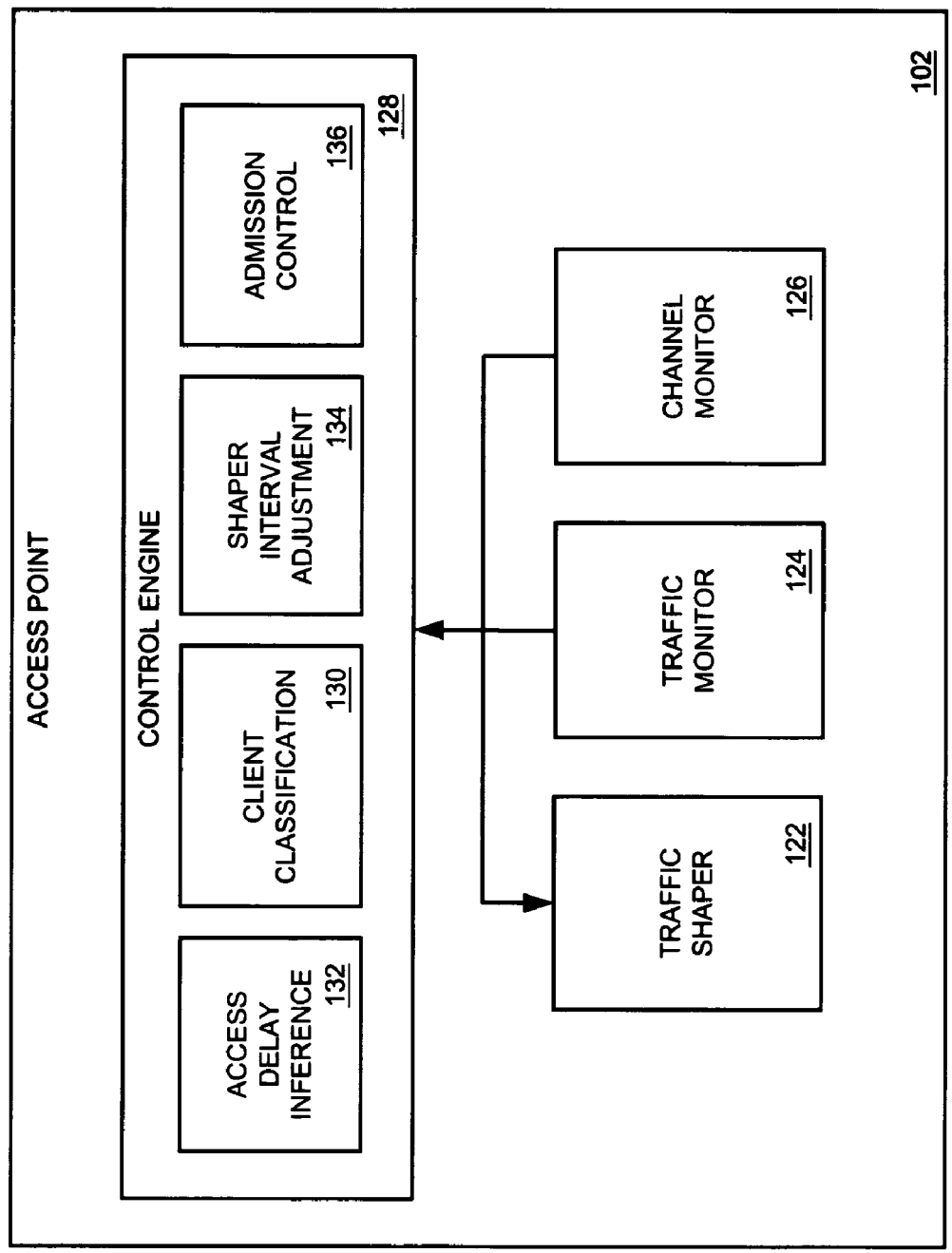
FIG. 2 is a block diagram of some potential components for the access point of FIG. 1 in accordance with some embodiments.

Now referring to FIG. 2, a block diagram of potential components for the access point 102 is provided. The access point 102 may include other hardware and/or software components not illustrated in FIG. 2.

The access point may include a traffic shaper 122, a traffic monitor 124, and a channel monitor 126 in communication with a control engine 128. The control engine 128 may include several components, such as a client classification component 130, access delay inference component 132, shaper interval adjustment component 134, and admission control component 136. One or more of the components 122, 124, 126, 128, 130, 132, 134, 136 may be implemented in hardware and/or software. In some embodiments, two or more of the components 122, 124, 126, 128, 130, 132, 134, 136 or some or all of their functionality may be combined or performed by a single or other component. In addition, the terms used for the components 130, 132, 134, 136 are used merely for convenience and ease of explanation and no specific limitations or requirements are meant or implied by their use.

The traffic monitor 124 measures the traffic load and frame spacing of both uplink and downlink traffic for the access point 102 and provides this information to the control engine 128. In some embodiments, the traffic monitor 124 may conduct or determine these measurements periodically, randomly, upon request, based on a network configuration setting, etc. to determine the traffic load for the access point 102 and client devices (e.g., the devices 104, 106, 108) in communication with the access point 102. For example, the traffic monitor 124 may record or otherwise determine the number of downlink transmissions made by the access point 102. The uplink number of retransmissions to the access point 102 from a client device (e.g., the device 104, 106, or 108) may be assumed to be the same as the downlink retransmissions from the access point 102 to the client device. As will be discussed in more detail below, the access point 102 then can classify each of its associated client devices according to the traffic load and frame spacing information. The control engine 128 can use the classification information and the traffic load information to adjust the shaping interval for the client devices associated with the access point 102.

The channel monitor 126 predicts the change or development in transmission rates for each of the client devices associated with the access point 102 and provides this information to the control engine 128. For example, IEEE 802.11 compliant devices may use rate adaptation algorithms to adjust their transmission rates based on channel conditions. Better channel conditions may lead to higher transmission rates that may then decrease if the channel conditions worsen. The channel monitor 126 may calculate or determine the number of retransmissions made by the access point 102 to each associated client device during a sample interval.

The channel monitor 126 monitors the channel condition for each associated client device for the access point 102 based on the strength of the radio signal (e.g., uplink Received Signal Strength Indicator (RSSI)). For example, the channel monitor 126 may proactively respond to a potential rate reduction due to a decreasing trend of the RSSI value for a client device, and at the same time filter out rate oscillations caused by periodic rate exploration of client device's rate adaptation algorithm. More specifically, the channel monitor 126 may maintain a set of historical signal strength values for each client device from received data and acknowledgement frames. The channel monitor 126 then may use these values to look up a corresponding transmission rate in a table which contains the minimum signal strength values required for each of the potential transmission rates. The determined rate may be used to update a moving average for the predicted uplink and downlink rate to filter out rate oscillation. Note that the moving average for the transmission rate for a client device may move along a continuous line and is not limited to being equal to the discrete transmission rates that may be allowed or provided for in a specific rate adaptation algorithm.

As will be discussed in more detail below, the control engine 128 classifies the client devices associated with the access point 102 and calculates a shaper interval for the client devices. The control engine 128 also performs admission control to determine whether or not to accept or reject new or additional bandwidth requirements for the incumbent or new critical client devices. Once the control engine 128 has determined the shaper interval for a client device, the control engine 128 provides the shaper interval information to the traffic shaper 122.

In general, the control engine 128 classifies its associated client devices based on their compliance with control actions and then calculates a new set of shaper intervals for these client devices. The control engine 128 performs these operations based on a delay-load estimation function. This function captures the impact on channel access time from the up/downlink traffic of each client device. In some embodiments, the formulation is based on a mathematical model of the IEEE 802.11 channel access mechanism, together with the runtime measurements of channel conditions and traffic loads. The control engine 128 can provide control of shaper intervals in real or near real time based on information received from the channel monitor 126 and the traffic monitor 124. As a result, the control engine 128 is able to guarantee the access time of critical client devices via the traffic shaper 122.

The traffic shaper 122 regulates the downlink traffic to each client device with consideration of the uplink traffic from each client device. Thus, the downlink traffic to each client device is regulated independently. The traffic shaper 122 can slow down the downlink traffic for a client device if there is an increase in the uplink traffic for the same client device. The traffic shaper 102 regulates the total uplink/downlink traffic for the client device so that the interframe interval is larger than a shaper interval specified by the control engine 128 for the client device. The control engine 128 adjusts the shaper interval based on inputs from the traffic monitor 124 and the channel monitor 126.

The traffic shaper 122 maintains a queue for each class of traffic and makes use of the per client power saving queue that is available in every access point instead of creating separate queues. The downlink transmissions from the access point 102 are scheduled by per client device watchdog timers built over fine granularity (e.g., down to one millisecond) clock interrupts.

For each client device, the access point 102 (e.g., the traffic shaper 122) uses a reference time to track when the next downlink transmission from the access point 102 to the client device can occur, which is the amount of time that must elapse after the last downlink transmission from the access point 102 to the same client device. By controlling the reference time for a client device, the access point 102 controls the total uplink/downlink traffic between the access point 102 and the client device. More specifically, the access point 102 uses a watchdog timer whose expiration date for a client device is modified by the reference time for the client device. The reference time is the time until the next downlink transmission by the access point 102. For example, when the reference time for a particular client device expires, the watchdog timer for the client device can trigger a downlink frame transmission from the access point 102 to the client device. The access point 102 can adjust the shaper interval for the client device, as specified by the control engine 128, to produce the correct reference time and, as a result, the correct interframe interval for the client device. Thus, packet or frame scheduling can be adjusted dynamically. The reference time for a particular client device can be adjusted by the access point 102 for every frame transmitted by the access point 102 and/or for every frame received by the access point 102. As a result, uplink frames can take the opportunities of downlink frames, so that downlink traffic from the access point 102 to the client device is slowed down accordingly to maintain compliance to the specified interframe interval for the client device.

Process Description

Figure 3:
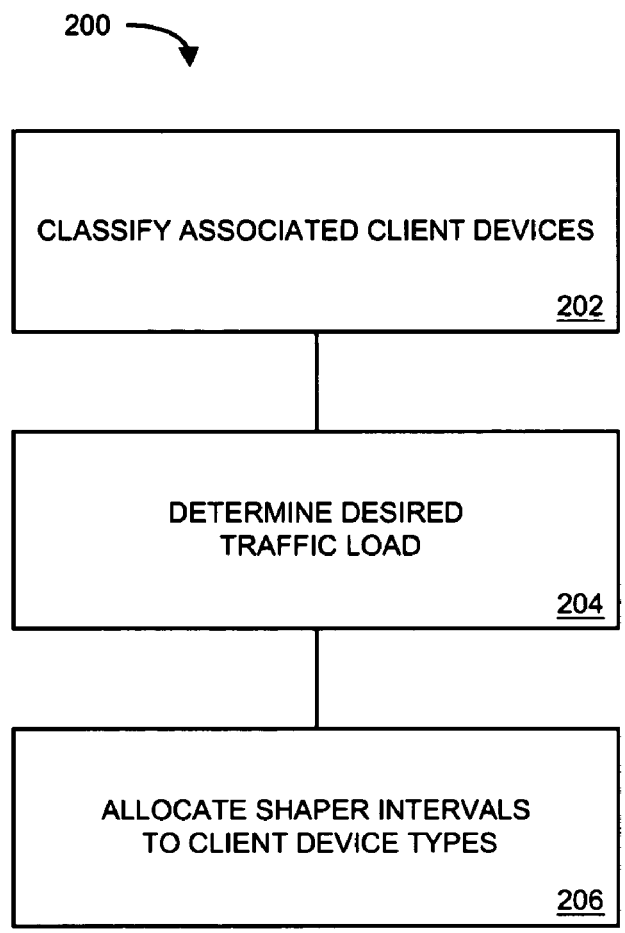
FIG. 3 is a flowchart of a first embodiment of a method in accordance with some embodiments.

Reference is now made to FIG. 3, where a flow chart 200 is shown which represents the operation of a first embodiment of a method. The particular arrangement of elements in the flow chart 200 is not necessarily meant to imply a fixed order to the elements; embodiments can be practiced in any order that is practicable.

In some embodiments, some or all of the elements of the method 200 may be performed or completed by the access point 102, as will be discussed in more detail below. As will be seen in the discussion below, the access point 102 can adjust the inter-frame interval for each of its associated client devices based on considerations of per client device channel variations, uplink traffic, and performance impacting features of IEEE 802.11 compliant client devices (e.g., power saving features) without having to use or have special software on the client devices and without having to modify the IEEE 802.11 standard.

Processing begins at step 202 during which the access point 102 classifies each of its associated client devices (e.g., mobile clients 104, 106, 108) into one of multiple types. The client classification component 130 may implement or conduct step 202.

During step 204, the access point 102 determines the desired traffic load for the access point based on information received from the traffic monitor 124 and channel monitor 126. The access delay inference component 132 may implement or conduct step 204.

During step 206, the access point 102 provides or otherwise allocates a shaper interval to the different client devices classified during step 202 based on the desired traffic load determined during 204. The access point 102 also may determine or allocated bandwidth (e.g., frame rate) for each of the client device types. In some embodiments, the shaper interval adjustment component 134 may implement or conduct step 206. There is an inverse relation between the allocated bandwidth and the shaper interval of the same client. That is, the higher the allocated bandwidth for a client device, the lower the shaper interval for the client device.

Potential implementations of each of the steps 202, 204, 206 will now be discussed in more detail.

As previously discussed above, some or all of 202 may be implemented or conducted by the client classification component 130. In general, during 202 the client classification component 130 classifies the client devices associated with the access point based on current and previous measurements of per-client downlink and uplink transmission rates, the number of retransmissions, and transmit/receive traffic loads. The access point 102 may reclassify each of its associated client devices periodically (e.g., every second), randomly, or in accordance with some other plan or procedure. A period of time over which traffic loads and other information are measured for use in classifying client devices will be referred to herein as a sample interval.

The classification of a client device can be governed by two criteria: (1) whether or not the client device is critical; and (2) whether or not the client device is compliant. A combination of both criteria leads to five different types of client devices: critical compliant (CC), critical non-compliant (CNC), non-critical satisfied (NCS), non-critical regulated (NCR), and non-critical non-responsive (NCNR). The CC and CNC client types are designed for critical client devices while the other three types are for non-critical client devices. Note that the terms used in the classification are selected merely for convenience and ease of explanation. In other embodiments, different classifications types for client devices may be used.

A client device may be specified or designated as critical as part of admission control, network configuration or setup, control parameter, administrator designation, etc. In some embodiments, a client device may be a client device as illustrated in FIG. 1 that appears in a critical client table with both enable and accepted flags set (i.e., its declared bandwidth has passed admission control). When the access point 102 admits a new associated client device or changes the bandwidth requirement for an existing associated client device, the client device will have a declared bandwidth associated with it. In some embodiments, the five following classification types for client devices are used:

Critical Compliant: A client device is classified as critical compliant if it is a critical client device and its measured traffic usage is within the range of its declared bandwidth. As will be discussed in more detail below, shaper intervals for CC classified client devices are set to zero (i.e., shaper intervals are not applied to CC client devices).

Critical Non-Compliant: A client device is classified as critical non-compliant if it is a critical client device and its measured traffic usage exceeds its declared bandwidth. As will be discussed in more detail below, when there is no traffic overload for the access point 102, the shaper interval of a CNC classified client device is set to zero (i.e., no shaper interval is applied to the CNC client device) and a CNC client device is treated like a CC client device. Under traffic overload for the access point 102, however, the CNC client device will be treated like a non-critical client device and a non-zero shaper interval will be applied to the CNC client device.

Non-Critical Satisfied: A client device is classified as non-critical satisfied if it is a non-critical client device and its measured traffic usage is below one-half of its allocated bandwidth. The corresponding allocated bandwidth for a client device is calculated as [(mean frame length of the client device)/(current shaper interval for the client device)]. As will be discussed in more detail below, in order to avoid wasting bandwidth for the access point 102, the shaper intervals of an NCS client device are lower bounded such that the allocated bandwidth for the client device is at most twice the actual bandwidth usage of the client device. If the traffic usage for the NCS client device exceeds the one-half of its allocated bandwidth, the status of the client device will be changed to non-critical regulated. Generally, a client device using web browsing applications may often be classified as NCS.

Non-Critical Regulated: A client device is classified as non-critical regulated if it is a non-critical device and its measured traffic usage is with fifty percent to one-hundred percent of its allocated bandwidth. An NCR client device is subjected to shaper interval control and its traffic will be shaped. An NCR client device's status can be changed to either non-critical satisfied or non-critical non-responsive depending on its current traffic usage. Generally, a client device using TCP applications (e.g., FTP file transfer) often may be classified as NCR.

Non-Critical Non-Responsive: A client device is classified as non-critical non-responsive if it is a non-critical device and its measured traffic usage consistently exceeds its allocated bandwidth. When under sever traffic overload for the access point 102, an NCNR client device can be forced to become disassociated from the access point 102. Generally, a client device generating a lot of uplink UDP traffic without flow control often may be classified as NCNR.

Figure 4:
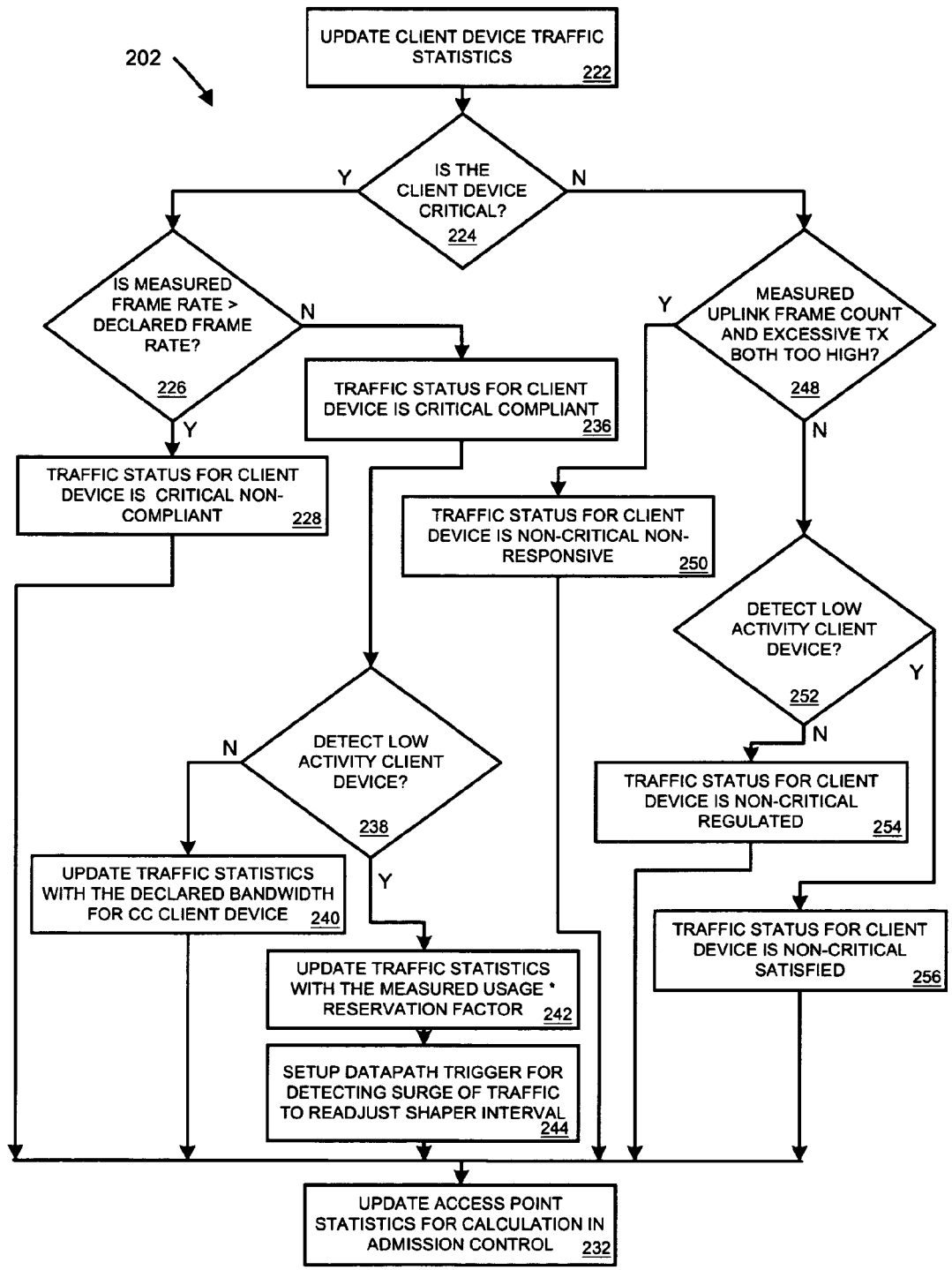
FIG. 4 is a flowchart illustrating one embodiment of the classify client device element of FIG. 3.

Reference is now made to FIG. 4, where a flow chart is shown which represents the operation of a first embodiment of process 202. The particular arrangement of elements in the flow chart in FIG. 4 is not necessarily meant to imply a fixed order to the elements; embodiments can be practiced in any order that is practicable. During 202, each of the client devices associated with the access point 102 are classified into one of the five types previously described above. A client device may switch classification types during its association with the access point 102. Classification of client devices may be conducted by the client classification component 130.

During 202, the access point 102 may take a snapshot of the traffic statistics for its associated client devices and then apply different traffic usage thresholds to detect if a critical client device is compliant or non-compliant or if a non-critical client device is satisfied, non-responsive, or regulated. After this, a determination may be made as to whether bandwidth underutilization is occurring with a client device so that unused bandwidth can be redistributed and used with more active client devices. For a critical client device, the operation calculates its reserved bandwidth based on the minimum between its declared bandwidth and a reservation factor cap over its current traffic usage.

During 222, the traffic statistics for each client device associated with the access point 102 are updated based on information created or otherwise determined by the traffic monitor 124. Thus, the classification of the associated client devices is based on the most recent traffic and configuration information as measured by the traffic monitor 124.

During 224, a determination is made as to whether a client device is critical or non-critical. As previously discussed above, the critical or non-critical nature of the client device typically is established as a control parameter or as part of a network configuration. Thus, information regarding the critical or non-critical nature of the client device may be stored in a configuration or other table, database, electronic record, etc. that is used or accessed by the access point 102.

During 226, if the client device is a critical device, a determination is made as to whether or not the critical client device's frame rate exceeds its declared frame rate. That is, a determination is made as to whether its measured traffic usage is within the range of its declared bandwidth. If the answer for 226 is "yes", the client device is classified as critical non-compliant in 228.

After 228, the statistics for the access point 102 are updated during 232 for calculation in admission control, as will be discussed in more detail below.

If the determination made during 226 is "no", the client device is classified as critical compliant during 236. Then, at 238, a determination is made as to whether or not the critical compliant client device is a low activity client. For example, a critical client device may be considered to be a low activity client if its measured frame count times its reservation factor during a sample interval is greater than the declared bandwidth. For critical clients, one-half of their declared bandwidth is used as the threshold to detect low activity. This has been explained in an earlier paragraph. For non-critical clients, their shaper intervals are not zero if there are critical clients currently associated with the access point. So zero shaper interval is not a concern for them either. If there are no critical clients associated with the access point, the whole control mechanism is suspended.

The reservation factor for a client device may create an additional percentage increased over the bandwidth or frame rate that must be maintained to accommodate a potential increase in usage by the client device if needed. Thus, a reservation rate of ten percent for the client device would require a bandwidth equal to 110 percent of the measured bandwidth for the client device for the traffic statistics set during 236. In some cases, a client device may have a reservation rate such that no excess or additional bandwidth for the client device is maintained. The reservation factor for the client device may be a control parameter established as part of network configuration.

If the determination made during 238 is "no", the access point 102 updates the traffic statistics for the critical compliant client device during 240 to reflect the declared frame rate. That is, the access point 102 maintains the bandwidth or frame rate for the client device that was originally declared for the client device. Thus, the traffic statistics are set to take into account the higher declared frame rate for the client device as opposed to the measured frame for the client device established in 222. After 240, the access point 102 proceeds to 232.

If the determination made during 238 is "yes", the access point 102 updates the traffic statistics for the critical compliant client device during 242 to reflect the measured usage for the client device times the reservation factor for the client device. Thus, the access point 102 maintains a bandwidth or frame rate for the client device that is higher than the current bandwidth or frame rate measured by the traffic monitor 124 for the client device and set in 222, but lower than the declared frame bandwidth or frame rate established for the client device. Thus, the client device has unused bandwidth in its declared frame rate that can be used with or applied to other client devices. In some embodiments, the upper bound for the critical compliant client device in 240 may be the client devices declared frame rate.

In addition to 242, during 244 the access point 102 sets up a data trigger for detecting a surge of traffic by the client device in order to adjust the shaper interval for the client device. That is, in 242 the access point 102 is able to take unused bandwidth for the critical client device so that it can be redistributed among non-critical client devices. However, this may result in impacting the performance by the client device if its traffic increases. Thus, the triggering mechanism established in 244 can help avoid this problem for the client device by causing the recalculation of bandwidth allocation for the client device and adjusting its shaper interval accordingly. After 242 and 244, the access point 102 proceeds to 232.

If in step 224 the client device is determined to be non-critical then at 248 a determination is made as to whether or not the client device's uplink frame count and excessive transmissions exceed their respective limits. For example, a client device's measured frame count may be considered to be too high if it is greater than the sample interval divided by the shaping interval for the client device.

The excess transmission threshold is a control parameter that may be set as part of network configuration and indicates the number of frames that can be sent in addition to a client device's normal upper threshold. Thus, the client device may be allowed to exceed its transmission rate occasionally, but not continuously, and still be considered compliant with its declared frame rate.

If the answer to the determination made during 248 is "yes", the client device is classified as non-critical non-responsive during 250 and the access point 102 proceeds to 232.

If the answer to the determination made during 248 is "no", a determination is made during 252 as to whether or not low activity is detected for the client device. For example, in some embodiments, a client device may be considered low activity if its measured arrival count during a sample interval times its retry factor times its reservation factor is less than or equal to the sample interval divided by the shaper interval for the client device during the sample interval.

The measured arrival count for a client device during a sample interval is the number of frames buffered from the client device by the access point 102 during the sample interval. The retry factor for the client device is the percentage of retransmissions made by the access point 102 for the client device during the sample interval and can be determined by the channel monitor 126.

As another example, a non-critical client device can be classified as non-critical regulated if it is a non-critical device and its current measured traffic usage is within fifty percent to one-hundred percent of its allocated bandwidth or as non-critical-satisfied if its current measured traffic usage is below one-half of its allocated bandwidth. Thus, the determination made during 252 can be a check to determine how much of its currently allocated bandwidth the non-critical client device is using.

If the answer to the determination made during 252 is "no", the client device is classified as non-critical regulated during 254 and the access point 102 proceeds to 232.

If the answer to the determination made during 252 is "yes" the client device is classified as non-critical satisfied during 256 and the access point 102 proceeds to 232.

During 232, the traffic statistics for the access point 102 are updated for use during admission control. More specifically, statistics for the access point are consolidated, which include the total traffic load and retry ratio for uplink and downlink, respectively.

After the client devices associated with the access point 102 are classified during 202, the desired traffic load for the access point 102 is determined during 204. From this, the total target frame rate for the access point 102 can be determined. The access delay inference component 132 may implement or conduct 204.

For each critical client device determined during 202, the access delay component 132 first determines the mean channel access delay with a mathematical model of the IEEE 802.11 contention avoidance mechanism, including the random access and exponential back-off behaviors. For a critical client device, this calculation estimates the mean channel access time for the target uplink traffic from the critical client device with the measured mean transmission time and inter-arrival time of the target traffic and the remaining aggregated traffic, respectively.

Many mathematical models exist for estimating mean channel access time and the methods of the present invention are not limited to any particular algorithm, process, formula, etc. As one example, two parameters, $c_1$ and $c_2$, may be defined and related to $aCW_{min}$ (the minimum contention window size established in IEEE 802.11) and $aCW_{max}$ (the maximum contention window size established in 802.11) as follows: $c_1=(1+aCW_{min})/2$ and $c_2=\log_2[(1+aCW_{min})/(1+aCW_{max})]$.

As used herein, the term "TxTime" is a single variable (not the multiplication of two variables) that refers to transmit or transmission time. For a critical client device, the total traffic load of the remaining traffic $load_{else}$ (i.e., the total traffic for the access point 102 excluding the traffic of this critical client device) can be determined with the ratio of the measured sum of the frame transmission times for the remaining critical client devices ($sum(T \times Time_{else})$) over the sampleinterval (i.e., the "sample interval" defined earlier) as follows:

$$load_{else} = sum(T \times Time_{else})/sampleinterval.$$

In addition, the parameter a can be determined as:

$$a=1/(2(1-load_{else}))+(1-(2load_{else})^{1+c_2})/(2(1-2load_{else})(1-load_{else})).$$

With these parameters, the back-off time of IEEE 802.11 media access control can be determined based on a Markov model of the exponential back-off mechanism for the IEEE 802.11 media access control. The mean back-off time that a critical client device experiences during contentions for channel access can be calculated as:

$$backoffTime = a \times c_1 \times SlotTime(1/(1-load_{else}))+T \times Time_{else}((1+load_{else})/(2(1-load_{else})))$$

where $T \times Time_{else}$ is the measured mean frame transmission time for the remaining traffic (i.e., the mean frame transmission time for the other critical client devices) and SlotTime is the parameter for the minimum time slot (in micro seconds) defined in the 802.11 standard.

The mean channel access time for the critical client device can be calculated as follows:

$$accessTime = T \times Time_{self} + (load_{else} \times backoffTime).$$

The calculations described above may use fractional numbers extensively. In some embodiments, in order to improve efficiency without sacrificing accuracy, the calculations may be implemented using only integer operations by internally transforming all fractional number calculations into integer operations.

The estimation of channel access delay time is determined for each critical client's uplink traffic and the aggregated critical downlink traffic with the help of fine granularity traffic and measurements from the channel monitor 126 and the traffic monitor 124. This takes into account that variations in traffic load for critical client devices may be client device and location specific. More specifically, the mean access time for the downlink and each critical client device's uplink traffic is inferred by the access delay inference component 132 using the equations described above. Then the maximum of these mean access time values is calculated as follows:

$$maxMeanAccessTime = max\{accessTime_{downlink}, max_{critical\_clients}\{accessTime_{uplink}\}\}.$$

In order to exert control to guarantee channel access delay, the maximum, instead of the mean, channel access delay is estimated and controlled. By treating the guaranteed access delay $accessTime_{guarantee}$ as the maximum queuing delay, and the inferred mean access time maxMeanAccessTime as the mean service time, the relations between the frame inter-arrival time and the probability of violation of the delay guarantee can related as an MIM/1/K loss model. The guaranteed access delay time may be established as or designated by a network configuration or control parameter.

In this formation, a packet loss probability $P_{loss}$ is interpreted or established as the probability of violating an access delay time guarantee and the buffer size K is interpreted or established as the maximum number of retransmissions a client device can try before violating the delay guarantee. As a result:

$$K = accessTime_{guarantee}/maxMeanAccessTime.$$

Since each client device may have a different guarantee time (i.e., a different $accessTime_{guarantee}$, the value of K may be different for different client devices.

The M/M/1/K packet loss formula gives a relation between the probability of access delay time violation and traffic intensity p as:

$$P_{loss}=(1-p)p^K/(1-p^{K+1})$$

with $P_{loss}$ given (e.g., $10^{-4}$, 6-nines of assurance) and K determined from above.

In some embodiments, the solution to p may be coded as a two-dimensional table of target loads versus delay guarantee levels since K and $P_{loss}$ are known. While solving for p can be done iteratively, pre-calculated values of p for different combinations of $P_{loss}$ and K values can be used to construct the two-dimensional table. At run time or during operation, the access delay inference component 132 may use the maximum of the desired guarantee level (which is related to $P_{loss}$) and queue depth K to find the desired value for p in the table and, as a result, the desired traffic load via a targetInterFrameSpace value. The guarantee level may model conservativeness in calculating the maximum channel access delay, e.g., a guarantee Level of 0, 1, and 2 corresponds to a $P_{loss}$ of $10^{-4}$ (i.e., 6-nines of assurance), $10^{-5}$, and $10^{-6}$, respectively. In some embodiments, implementations may use a guarantee Level of 2 for higher assurance on delay guarantee, but at the cost of lower bandwidth usage.

Solving for p for a client device leads to the maximum traffic intensity (p*) for the client device, below which the access time delay guarantee will be assured with probability of 1-$P_{loss}$ for the client device. Subsequently, the target frame interarrival time for the client device is calculated as:

targetInterFrameSpace=maxMeanAccessTime/p*.

The target frame rate is then determined by the ratio of sample interval over targetInterFrameSpace (i.e., sampleInterval/targetInterFrameSpace)

In situations where different critical client devices have different access delay times, the shortest access delay time is used for all of the critical client devices. Thus, the values for $P_{loss}$, K, p, p*, and targetInterFrameSpace will be the same for all critical client devices.

The targetInterFrameSpace value for the client device is then used by the shaper interval adjustment 134 in the control engine 128 to regulate the total amount of traffic load. As mentioned previously, a goal is to adjust the shaper interval for each client device with respect to its current uplink and downlink traffic loads so that the total traffic load for the access point 102 is below, but close to, the desired traffic load specified by the targetInterFrameSpace value.

During 206, the shaper interval adjustment component 134 determines the allocated bandwidth or frame rate (or equivalently, the shaper interval) for each client device associated with the access point 102. For example, once the client devices are classified during 202 and the maxMeanAccessDelay time is determined during 204, a total target frame rate for available for all of the client devices may be found from a table that associates traffic loads with the different K and $P_{loss}$ values for a set of client devices as previously discussed above (e.g., target frame rate=sampleInterval/targetInterFrameSpace). The access point 102 may have, use, keep, or have access to such a table to allow determination of the total target frame rates.

The total target frame rate for all of the client devices can be used to determine if an overload traffic condition exists for the access point 102. For any client device having a non-zero shaper interval, the frame rate for the client device is equal to the sample interval for the client device divided by the shaper interval for the client device. Thus, setting a non-zero shaper interval for a client device also sets the frame rate for the client device, and vice versa.

In some embodiments, shaper intervals and frame rates for different types of client devices may be set as follows.

First, for critical compliant client (CC) devices, the shaper interval is set to zero.

As will be discussed in more detail below, a total target frame rate for the access point 102 will be determined using the maxMeanAccessDelay value calculated above. From this total target frame rate, the frame rate statistics for each critical compliant client device as set in FIG. 2 is subtracted. Thus, for a critical compliant client device, the frame rate is its declared frame rate (as set in 240) or whatever it is currently using times its reservation factor (as set in 242), whichever is smaller.

Second, the shaper interval for a non-critical non-responsive (NCNR) client device is the same as an NCR client device, unless there is severe traffic overload for the access point 102, and the frame rate for the NCNR client device is set to its measured frame rate and subtracted from the total target frame rate. However, when the total traffic load of CC and NCNR client devices exceeds the link capacity for the access point 102, the NCNR client devices will be forced to disassociate from the access point 102. For example, the access point 102 may send an IEEE 802.11 compliant deauthenticate message with the reason code "TOOMANY_ASSOC" to the NCNR client devices.

Third, for each critical non-compliant (CNC) client device, the shaper interval is set to zero if there is no traffic overload for the access point 102. In addition, the frame rate for the CNC client device is set to its measured frame rate (as set in 222) and subtracted from the total target frame rate. However, when there are CC client devices and the total load from the CC, CNC and NCNR client devices exceeds the total link capacity for the access point 102, the CNC client devices are treated the same as NCR client devices. That is, a non-zero shaper interval will be applied to each CNC client device and the frame rate set accordingly in the same manner as an NCR client device.

Fourth, the shaper interval for a non-critical satisfied (NCS) client device, a determination is made as to whether or not to cap its bandwidth allocation. The bandwidth allocation for the NCS client devices may need to be capped when Its current measured traffic times the reservation factor (whose value is two) is still less than the average bandwidth allocation. If the bandwidth allocations for the NCS client devices do not need to be capped, they are treated the same as NCR client devices. If the bandwidth allocations for the NCS client devices do need to be capped, then its allocated bandwidth value is determined by its current measured traffic times the reservation factor.

The shaper interval for an NCS client device is always no greater than the shaper interval for its NCR counterpart. More specifically, the inverse of the shaper interval for an NCS client device is bounded by two times its traffic usage if there are no other non-critical client devices. Otherwise, the NCS client device is treated the same as an NCR client device.

Fifth, for the non-critical regulated (NCR) client devices or other types of client devices that are being treated as NCR client devices, the non-zero shaper interval is calculated by the equal distribution of the desired traffic load among all the NCR or NCR-treated client devices. For example, the remaining bandwidth can be equally divided among these client devices (e.g., allocated bandwidth per client device equals remaining frame rate divided by the number of NCR or NCR-treated client devices). The frame rate for the NCR client device then can be determined accordingly. However, when there are no critical client devices associated with the access point 102, the shaper interval for all non-critical client devices is set to zero and the shaper control mechanism is effectively suspended.

Figure 5:
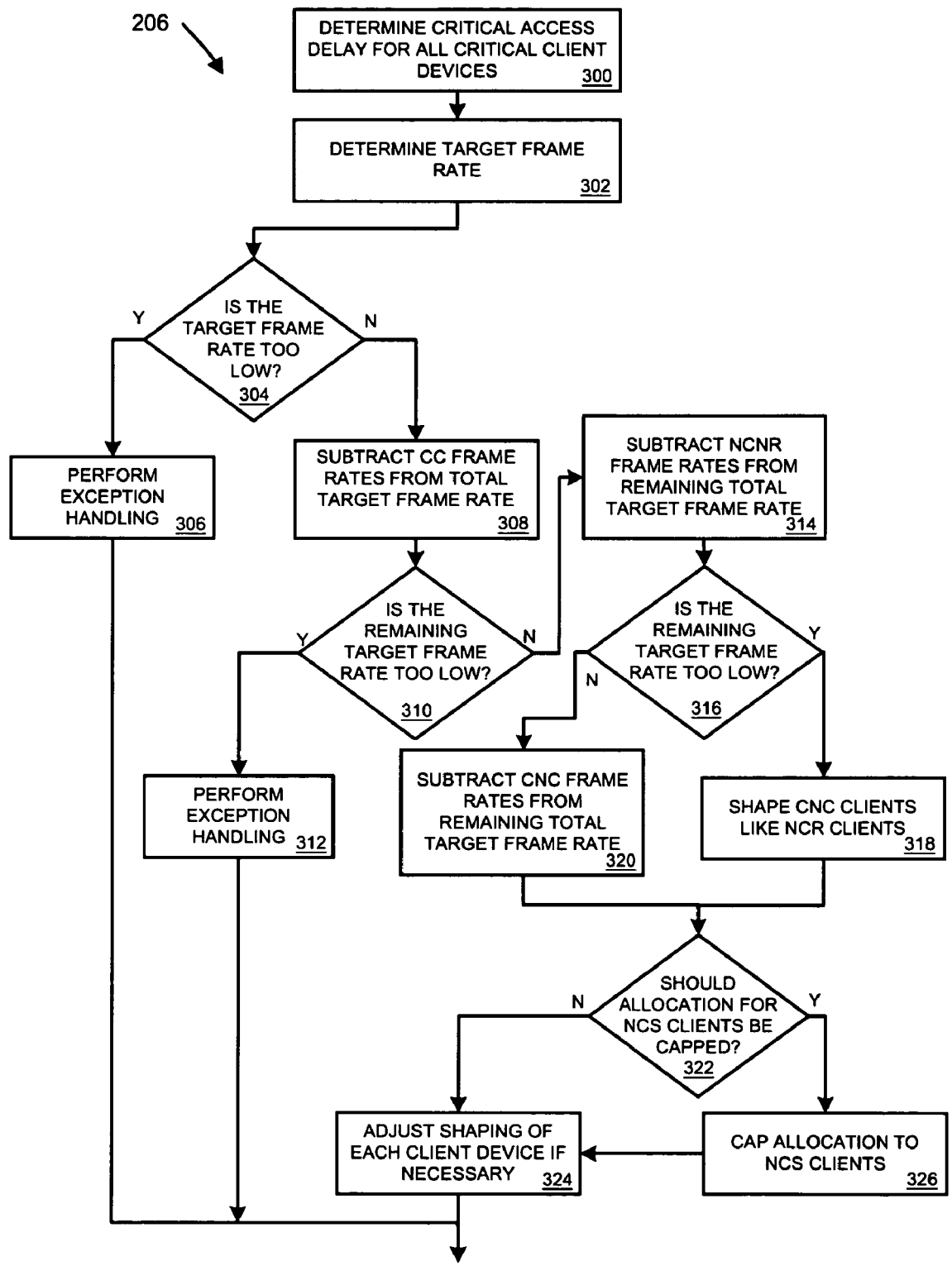
FIG. 5 is a flowchart illustrating one embodiment of the allocate bandwidth and shaper interval element of FIG. 3.

Reference is now made to FIG. 5, where a flow chart is shown which represents the operation of a first embodiment of process 206. The particular arrangement of elements in the flow chart in FIG. 5 is not necessarily meant to imply a fixed order to the elements; embodiments can be practiced in any order that is practicable.

During 300, a critical access delay time value is determined for all critical client devices. This value for of maxMeanAccessDelay time value calculated above during 204 can be used as this critical access delay time value.

During 302, a total target frame rate for the access point 102 is determined based on the maxMeanAccessDelay time value. As previously discussed above, in some embodiments, the access point 102 may use, have, keep or have access to a table that allows the access point 102 to determine p as previously discussed above. From p, the total target frame rate can be determined as also previously discussed above. The total target frame rate indicates the total bandwidth available for all client devices associated with the access point 102.

During 304, a determination is made as to whether the total target frame rate determined during 302 is too low to support the frame rates of all of the critical compliant client devices as they were set in FIG. 4 (see 240, 242).

If the answer to the determination in 304 is "yes" and the access point 102 moves to 306 for exception handling. During 306, the access point 102 provides or under goes exception handling for admission control failure and resets the shaper intervals for all clients. More specifically, the shaper intervals of all non-critical client devices and critical non-compliant client devices are set to the maximum shaper interval value, which is a system configuration parameter. In addition, some critical compliant clients will be changed to non-critical clients based on a pre-configured order list. This reduces the total frame rates of critical compliant client devices.

If the answer to the determination in 304 is "no", the frame rates for all of the critical compliant client devices is subtracted from the total target frame rate during 308.

At 310, a determination is made as to whether the remaining total target frame rate is too low to support the frame rates of all of the non-critical non-responsive client devices as set in FIG. 4 (see 222, 250).

If the answer to the determination in 310 is "yes" and the access point 102 moves to 312 for exception handling. During 312, the access point 102 provides or under goes exception handling for non-responsive client devices and forces their disassociation. More specifically, disassociation messages will be sent to these non-critical non-responsive client devices and they will be disconnected from the access point. This removes all the traffic of non-critical non-responsive client devices from the network.

If the answer to the determination made in 310 is "no", during 314 the frame rates for all of the non-critical non-compliant client devices are subtracted from the remainder of the total frame rate calculated in 308.

During 316, a determination is made as to whether the remaining total target frame rate calculated or determined during 314 is too low to support the frame rates of all of the critical non-compliant client devices as they were set in FIG. 4 (see 222).

If the answer to the determination made in 316 is "yes", during 318 the critical non-compliant client devices are treated like non-critical regulated client devices.

If the answer to the determination made in 316 is "no", during 320 the frame rates for the critical non-compliant client devices are subtracted from the remaining total frame rate calculated or determined during 314. The shaper intervals for the critical non-compliant client devices are set to zero.

During 322, a determination is made to see if the remaining frame rate determined in 320 is high enough so that the hypothetical frame rate allocations for non-critical satisfied client devices will exceed their current traffic usage times the reservation factor. If the remaining frame rate is high enough, their frame rate allocation will need to be capped at their current traffic usage times the reservation factor so that no bandwidth will be wasted. If the remaining frame rate is not high enough for the frame rate allocations for non-critical satisfied client devices to exceed their current traffic usage times the reservation factor, then all non-critical satisfied client devices are treated the same way as non-critical regulated client devices. For example, this determination can be made by checking to see if the hypothetical frame rate allocation (i.e., treating all non-critical satisfied and non-critical regulated client devices the same) for each non-critical satisfied client device is higher than the mean measured frame rate times reservation factor of non-critical satisfied client devices.

If the answer to the determination made in 322 is "no", the shaper intervals for each client device can be adjusted if necessary during 324. The shaper interval of non-critical satisfied client devices will be determined the same way as those of non-critical regulated client devices. For example, the target frame rate is equally distributed among all non-critical regulated client devices and other types of client devices if they are decided to be included as non-critical regulated by the descriptions above, and subsequently the shaper interval of each client device is determined by (sample interval)/(allocated frame rate). If the shaper intervals are being decreased, a maximum amount of reduction may be established so that the shaper intervals are not reduced too fast.

If the answer to the determination made in 322 is "yes", the bandwidth or frame rate allocations to non-critical satisfied client devices may be capped during 326. For example, the total capped frame rate of all non-critical satisfied client devices is subtracted from the target frame rate. That is, the non-critical satisfied clients are treated separately in frame rate allocation from the non-critical regulated clients. The access point 102 then can move to 324.

The access point 102 may perform the step 206 for each client device associated with it so that all of the client devices have their target frame rates, and hence their shaper intervals adjusted or set.

Once the control engine 128 has determined the shaper intervals for the client devices associated with access point 102, the traffic shaper 122 can determine the reference times for downlink transmissions from the access point 102 to produce the desired shaper intervals by each of the client devices. For example, in some embodiments the reference time used by the access point 102 for a particular client device associated with the access point 102 is the sum of the most recent shaper interval determined for the client device and the most recent time for the access point 102 receiving a frame from the client device or transmitting a frame to the client device. The access point 102 will determine reference times for each of its associated client devices based on the shaper intervals determined for each of its associated client devices. Thus, the access point can control the occurrence of all of the downlink transmissions to all of its associated client devices in order to regulate the total uplink/downlink traffic.

Figure 6:
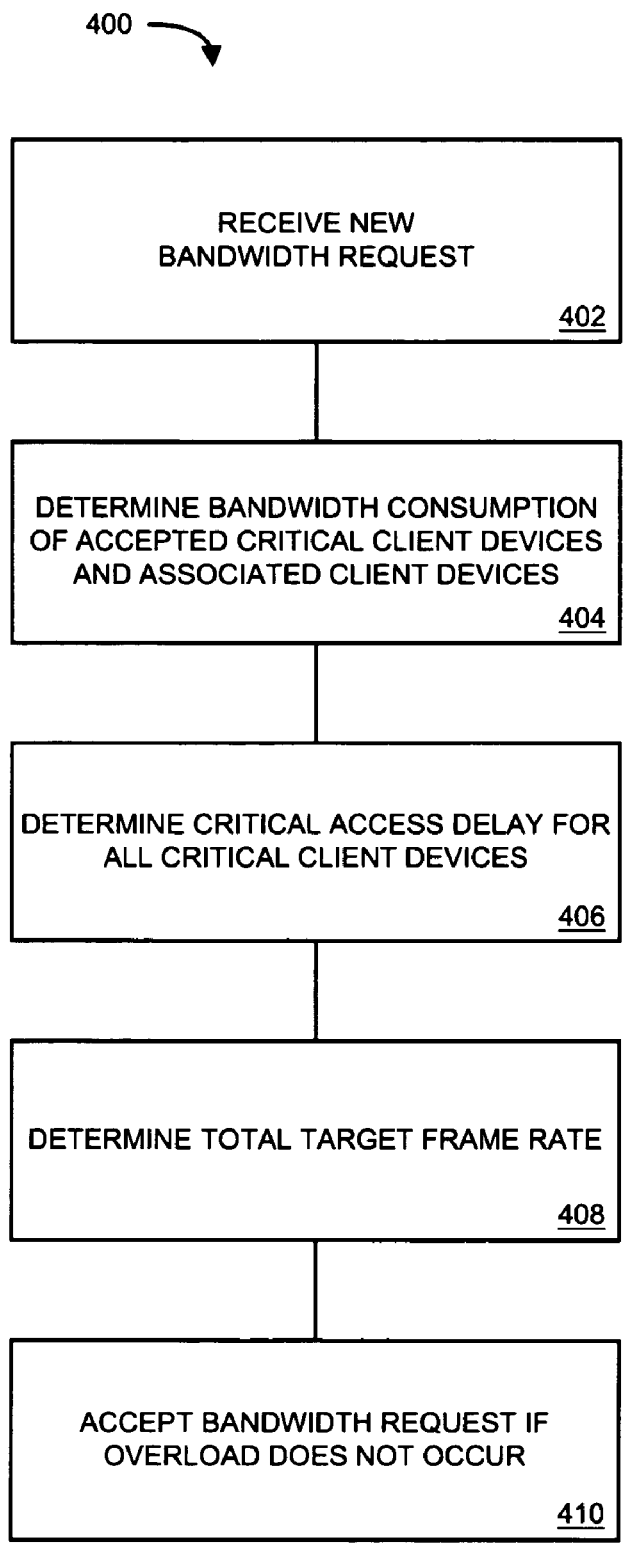
FIG. 6 is a flowchart of a second embodiment of a method in accordance with some embodiments.

Reference is now made to FIG. 6, where a flow chart 400 is shown which represents the operation of a second embodiment of a method. The particular arrangement of elements in the flow chart 400 is not necessarily meant to imply a fixed order to the elements; embodiments can be practiced in any order that is practicable.

The method 400 is particularly suited for preventing over-committing of critical client device's declared bandwidth and for minimizing violations in delay guarantee. The method 400 allows or enables the access point 102 to perform admission control based on predicted channel conditions, the measured number of retransmission retries, and the measured traffic usage of non-responsive client devices. The method 400 may be implemented or conducted by the admission control component 136 of the control engine 128 in the access point 102.

In some situations, the access point 102 may reserve bandwidth for use with critical client devices. If not enough critical clients are associated with the access point 102 or if the current critical client devices are under-utilizing their bandwidth, bandwidth may be wasted or used inefficiently by the access point 102. However, the reserved bandwidth for critical client devices is not wasted if it is used for currently associated non-critical client devices. Thus, for example, if no critical client devices are associated with the access point 102, the shaper intervals for all non-critical client devices may be reduced and even set to zero. For an associated critical client device, the effective reserved bandwidth may be calculated as the minimum between the declared bandwidth for the client device and twice its current measured bandwidth usage. Any remaining declared bandwidth usage then can be distributed to non-critical client devices associated with the access point to increase their bandwidth.

Processing begins at 402 during which the admission control component 136 receives a new bandwidth request. The bandwidth request may come from a new client device that wants to be associated with the access point 102 or from a current or incumbent client device that wants to increase or change its bandwidth.

During 404 the admission control component 136 determines the total bandwidth consumption of accepted critical client devices and all associated client devices. For each client device classified as critical compliant, the bandwidth consumption is taken to be the reserved bandwidth (or the declared bandwidth) for the client device times the retry ratio for the client device. For each critical non-compliant client device and each non-critical non-responsive client device, the bandwidth consumption is taken to be the measured bandwidth for the client device times the retry ratio for the client device. For each non-critical satisfied client device and each non-critical regulated client device, the bandwidth consumption is taken to be the minimum frame rate of a configuration parameter times the retry ratio for the client device.

For the new bandwidth request, the bandwidth consumption is assumed to be the declared bandwidth for the client device making the request times the client device's retry ratio. If the client device making the new bandwidth request already is associated with the access point 102, the retry ratio is measured for the client device. If the client device making the new bandwidth request is not already associated with the access point 102, a default retry ratio (e.g., 2) can be used.

During 406, the access delay is determined for all critical client devices associated with the access point. This maxMeanAccessDelay previously discussed above is recalculated with the new set of frame rates calculated in 404.

During 408, a target total frame rate for all client devices can be determined from a table that associates maxMeanAccessDelay time values with delay guarantee values and traffic loads to give a target frame rate as previously discussed above.

During 410, the access point 102 can accept the new bandwidth request if overload for the access point 102 does not occur as a result of the new bandwidth request. Otherwise, the access point rejects the new bandwidth request. In some embodiments, the access point 102 may send a message to the client device that submitted the new bandwidth request informing the client device or acceptance or rejection of the new bandwidth request.

Access Point

Figure 7:
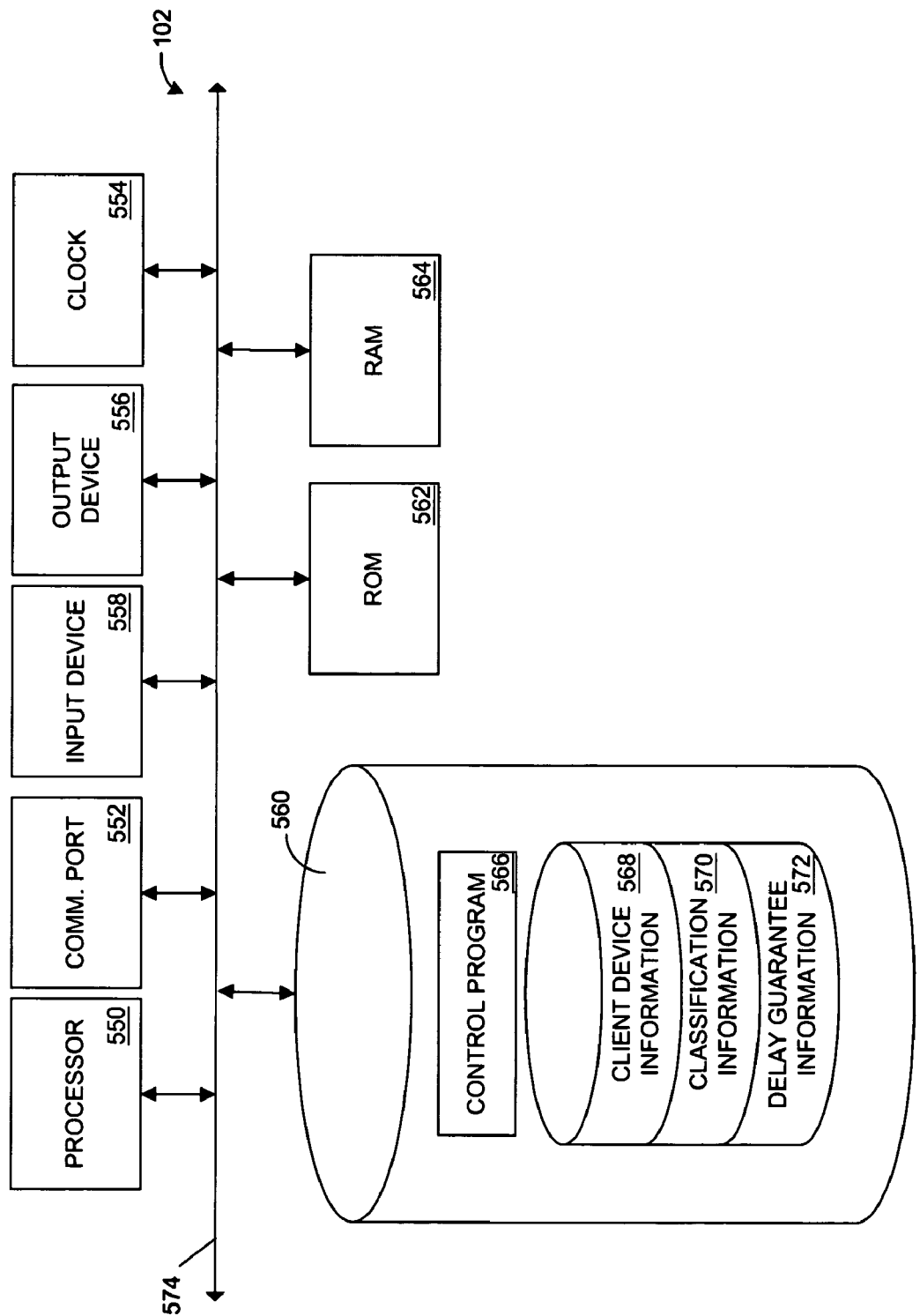
FIG. 7 is a block diagram of additional potential components for the access point of FIG. 1 in accordance with some embodiments.

Now referring to FIG. 7, a representative block diagram of the access point 102 is illustrated. As previously discussed above, the access point 102 also may include the components previously described above in reference to FIG. 2.

In some embodiments, the access point 102 can comprise a single device or computer, a networked set or group of devices or computers, a workstation, mainframe or host computer, etc. In some embodiments, the access point 102 may implement one more elements of the methods disclosed herein.

The access point 102 may include a processor, microchip, central processing unit, or computer 550 that is in communication with or otherwise uses or includes one or more communication ports 552 for communicating with client devices and/or other devices. The processor 550 may be operative or adapted to implement one or more of the elements of the methods disclosed herein. Communication ports may include such things as local area network adapters, wireless communication devices, Bluetooth technology, etc. The access point 102 also may include an internal clock element 554 to maintain an accurate time and date for the access point 102, create time stamps for communications received or sent by the access point 102, etc.

If desired, the access point 102 may include one or more output devices 556 such as a printer, infrared or other transmitter, antenna, audio speaker, display screen or monitor, text to speech converter, etc., as well as one or more input devices 558 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the access point 102 may include a memory or data storage device 560 to store information, software, databases, documents, communications, device drivers, etc. The memory or data storage device 560 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The access point 102 also may include separate ROM 562 and RAM 564.

The processor 550 and the data storage device 560 in the access point 102 each may be, for example: (i) located entirely within a single computer or other computing device; or (ii) connected to each other by a remote communication medium, such as a serial port cable, telephone line or radio frequency transceiver. In one embodiment, the access point 102 may comprise one or more computers that are connected to a remote server computer for maintaining databases.

A conventional personal computer or workstation with sufficient memory and processing capability may be used as the access point 102. The access point 102 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 550. Other or equivalent or other processors may be available from Motorola, Inc., AMD, or Sun Microsystems, Inc. The processor 550 also may comprise one or more microprocessors, computers, computer systems, etc.

Software may be resident and operating or operational on the access point 102. The software may be stored on the data storage device 560 and may include a control program 566 for operating the server, databases, etc. The control program 566 may control the processor 550. The processor 550 preferably performs instructions of the control program 566, and thereby operates in accordance with the methods described in detail herein. The control program 566 may be stored in a compressed, uncompiled and/or encrypted format. The control program 566 furthermore includes program elements that may be necessary, such as an operating system, a database management system and device drivers for allowing the processor 550 to interface with peripheral devices, databases, etc. Appropriate program elements are known to those skilled in the art, and need not be described in detail herein.

The access point 102 also may include or store information regarding identities, user devices, contexts, mapping tables, communications, etc. For example, information regarding one or more client devices may be stored in a client device database 568 for use by the access point 102 or another device or entity. Information regarding one or more device classifications may be stored in a device classification database 570 for use by the access point 102 or another device or entity and information regarding one or more delay guarantees may be stored in a delay guarantee information database 572 for use by the access point 102 or another device or entity. In some embodiments, some or all of one or more of the databases may be stored or mirrored remotely from the access point 102.

According to some embodiments, the instructions of the control program may be read into a main memory from another computer-readable medium, such as from the ROM 562 to the RAM 564. Execution of sequences of the instructions in the control program causes the processor 550 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 550, communication port 552, clock 554, output device 556, input device 558, data storage device 560, ROM 562, and RAM 564 may communicate or be connected directly or indirectly in a variety of ways. For example, the processor 550, communication port 552, clock 554, output device 556, input device 558, data storage device 560, ROM 562, and RAM 564 may be connected via a bus 574.

While specific implementations and hardware/software configurations for the access point 102 have been illustrated, it should be noted that other implementations and hardware configurations are possible and that no specific implementation or hardware/software configuration is needed. Thus, not all of the components illustrated in FIG. 7 may be needed for the access point 102 implementing the methods disclosed herein.

In some embodiments, an apparatus may include a processor; a communication port coupled to the processor and adapted to communicate with at least one device; and a storage device coupled to the processor and storing instructions adapted to be executed by the processor to classify each of a plurality of client devices into one of a plurality of potential client device types; determine a desired traffic load for the plurality of client devices; and allocate shaper intervals to each of the plurality of client devices based on client device type classification and the desired traffic load. In some other embodiments, an apparatus may include a processor; a communication port coupled to the processor and adapted to communicate with at least one device; and a storage device coupled to the processor and storing instructions adapted to be executed by the processor to receive a request for new bandwidth to be provided by an access point; determine bandwidth consumption of accepted critical client devices and other client devices associated with the access point; determine critical access delay for all of the critical client devices; determine the total target frame rate for the access point based on the critical access delay; and accept the bandwidth requirement if the request does not cause an overload condition for the access point.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for providing a delay guarantee for each of a plurality of client devices associated with an access point, comprising:

classifying each of said plurality of client devices into one of a plurality of client device types based on, at least, a measurement of current and previous traffic loads for each of said plurality of client devices, and a determination of whether said client device is critical;

determining a desired traffic load for said access point;

determining a traffic intensity p for each of said plurality of client devices, below which the access time delay guarantee will be assured with probability of $1-P_{loss}$ for each of said plurality of client devices where said traffic intensity p is determined using the relationship of:

$$P_{loss}=(1-p)p^K/(1-p^{K+1})$$

where packet loss probability $P_{loss}$ is a probability of violating an access delay time guarantee and a buffer size K is a buffer size representative of a maximum number of retransmissions a client device can try before violating the delay guarantee; and allocating shaper intervals to each of said plurality of client devices based on said client device type classification of each of said plurality of client devices, said desired traffic load of said access point, and a maximum of said determined traffic intensity p for each of said plurality of client devices wherein said classifying, determining, and allocating are performed by said access point.

2. The method of claim 1, wherein said client device types include critical compliant, critical non-compliant, non-critical satisfied, non-critical regulated, and non-critical non-responsive.

3. The method of claim 2, wherein said allocating shaper intervals to each of said plurality of client devices based on said client device type classification and said desired traffic load includes allocating a shaper interval of zero to a client device classified as critical compliant.

4. The method of claim 3, wherein said allocating shaper intervals to each of said plurality of client devices based on said client device type classification and said desired traffic load includes allocating a shaper interval of zero to a client device classified as critical non-compliant if no traffic overload exists for said access point.

5. The method of claim 3, wherein said allocating shaper intervals to each of said plurality of client devices based on said client device type classification and said desired traffic load includes allocating a non-zero shaper interval to a client device in said plurality of client devices classified as critical non-compliant when a traffic overload exists for said access point and said plurality of client devices includes at least one client device classified as critical compliant.

6. The method of claim 1, further comprising:

disassociating at least one of said plurality of client devices from said access point if a traffic overload exists for said access point.

7. The method of claim 1, wherein said determining a desired traffic load for said plurality of client devices includes determining a maxMeanAccessTime value associated with said plurality of client devices.

8. The method of claim 7, wherein said determining a desired traffic load for said plurality of client devices includes determining an access delay time for a first of said plurality of client devices.

9. The method of claim 7, wherein said determining a desired traffic load for said plurality of client devices includes determining a targetInterFrameSpace value associated with said plurality of client devices.

10. The method of claim 1, further comprising:

allocating bandwidth to each of said plurality of client devices.

11. The method of claim 10, wherein said allocating bandwidth to each of said plurality of client devices includes determining a target frame rate and shaper interval for a first client device in said of said plurality of client devices based on a guarantee delay time associated with said first client device and a maxMeanAccessDelay value associated with said plurality of client devices.

12. The method of claim 1, further comprising:

determining a reference time for a first client device in one of said plurality of client devices based on a shaper interval associated with said first client device.

13. The method of claim 1, wherein said allocating shaper intervals to each of said plurality of client devices based on client device type classification and said desired traffic load includes allocating a shaper interval to a first client device in said plurality of client devices such that said first client device's interframe interval is larger than said shaper interval.

14. The method of claim 1, further comprising:

determining a guarantee delay value for a first of said plurality of client devices.

15. The method of claim 1, further comprising:

receiving a request for new bandwidth.

16. The method of claim 15, further comprising:

determining bandwidth consumption for at least some of said plurality of client devices.

17. The method of claim 16, further comprising:

determining if said new bandwidth will create overload for said access point.

18. The method of claim 1, wherein said access point performs:

said classifying each of said plurality of client devices into one of a plurality of potential client device types;

said determining a desired traffic load for said plurality of client devices; and said allocating shaper intervals to each of said plurality of client devices based on said client device type classification and said desired traffic load.

19. An article of manufacture comprising:

a computer readable non-transitory medium having stored thereon instructions which, when executed by a processor, cause said processor to:

classify each of a plurality of client devices associated with an access point into one of a plurality of client device types based on, at least, a measurement of current and previous traffic loads for each of said plurality of client devices, and a determination of whether said client device is critical;

determine a desired traffic load for said access point;

determine a traffic intensity p for each of said plurality of client devices, below which the access time delay guarantee will be assured with probability of $1-P_{loss}$ for each of said plurality of client devices where said traffic intensity p is determined using the relationship of:

$$P_{loss}=(1-p)p^K/(1-p^{K+1})$$

where packet loss probability $P_{loss}$ is a probability of violating an access delay time guarantee and a buffer size K is a buffer size representative of a maximum number of retransmissions a client device can try before violating the delay guarantee; and allocate shaper intervals to each of said plurality of client devices based on said client device type classification of each of said plurality of client devices, said desired traffic load of said access point, and a maximum of said determined traffic intensity p for each of said plurality of client devices, wherein said classifying, determining, and allocating are performed by said access point.

20. An apparatus, comprising:

a processor;

a communication port coupled to said processor and adapted to communicate with at least one device; and a storage device coupled to said processor and storing instructions adapted to be executed by said processor to:

classify each of a plurality of client devices associated with an access point into one of a plurality of client device types based on, at least, a measurement of current and previous traffic loads for each of said plurality of client devices, and a determination of whether said client device is critical;

determine a desired traffic load for said access point;

determine a traffic intensity p for each of said plurality of client devices, below which the access time delay guarantee will be assured with probability of $1-P_{loss}$ for each of said plurality of client devices where said traffic intensity p is determined using the relationship of:

$$P_{loss}=(1-p)p^K/(1-p^{K+1})$$

where packet loss probability $P_{loss}$ is a probability of violating an access delay time guarantee and a buffer size K is a buffer size representative of a maximum number of retransmissions a client device can try before violating the delay guarantee; and allocate shaper intervals to each of said plurality of client devices based on said client device type classification of each of said plurality of client devices, said desired traffic load of said access point, and a maximum of said determined traffic intensity p for each of said plurality of client devices, wherein said classifying, determining, and allocating are performed by said access point.

* * * * *